United States Patent
Anantharaman et al.

(10) Patent No.: US 9,766,980 B1
(45) Date of Patent: Sep. 19, 2017

(54) RAID FAILURE PREVENTION

(71) Applicant: EMC Corporation, Hopkinton, MA (US)

(72) Inventors: Krishnamoorthy Anantharaman, Karnataka (IN); Michael D. Garvey, Brimfield, MA (US); Andrew Chanler, Berlin, MA (US); Dale Elliott, Northborough, MA (US); Stephen Richard Ives, West Boylston, MA (US); Prakash Venkatanarayanan, Karnataka (IN); Kevin E. Granlund, Sutton, MA (US); Edward S. Robins, Winchester, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 581 days.

(21) Appl. No.: 13/886,763

(22) Filed: May 3, 2013

(51) Int. Cl.
*G06F 11/00* (2006.01)
*G06F 11/10* (2006.01)

(52) U.S. Cl.
CPC .................. *G06F 11/1092* (2013.01)

(58) Field of Classification Search
CPC ............... G06F 11/008; G06F 11/3409; G06F 11/3034; G06F 11/004; G06F 2211/10–2211/1095
See application file for complete search history.

(56) References Cited

U.S. PATENT DOCUMENTS

| | | | |
|---|---|---|---|
| 5,917,724 A * | 6/1999 | Brousseau et al. | 700/81 |
| 2003/0204788 A1 * | 10/2003 | Smith | 714/47 |
| 2005/0240804 A1 * | 10/2005 | Schnapp et al. | 714/6 |
| 2008/0244318 A1 * | 10/2008 | Guha | 714/37 |
| 2009/0106602 A1 * | 4/2009 | Piszczek et al. | 714/42 |
| 2009/0271657 A1 * | 10/2009 | McCombs et al. | 714/6 |

* cited by examiner

*Primary Examiner* — Jason Bryan
(74) *Attorney, Agent, or Firm* — Anderson Gorecki LLP

(57) ABSTRACT

Individual storage devices of a RAID group are monitored for faults. A health indicator for each storage device is calculated based on fault growth rate. Non-failed storage device are swapped out based on the health indicator. Techniques for monitoring the storage devices include background media scans and growth list polling.

27 Claims, 5 Drawing Sheets

RAID FAILURE PREVENTION

CROSS-REFERENCE TO RELATED APPLICATIONS

N/A

BACKGROUND OF THE INVENTION

Aspects of this invention are generally related to data storage, and more particularly to distributed data storage systems such as a redundant array of inexpensive disks (RAID). Enterprise storage platforms are relied upon to maintain data which may critical to the operation of enterprises. The storage platforms typically includes features such as RAID storage groups to help maintain and protect the data. Various levels of RAID storage are known in the art, but in general RAID systems are designed to enable recovery from data corruption and failure of a physical storage device such as a disk. A level 1 RAID system, for example, maintains copies of a set of data on two or more physical storage devices such as a mirrored pair of disks. Consequently, if one of the disks fails the data is still available from the mirror disk. While RAID 1 is highly reliable, it will be appreciated that it can require considerable storage capacity. Features such as parity data are used in some other RAID levels in order to achieve reduced storage capacity requirements. Features such as byte or block level striping are used in some RAID levels in order to achieve enhanced response time. RAID 5, for example, uses block level striping with parity data distributed across all devices. Generally, there are tradeoffs between reliability, efficiency, and response time.

Reliability of the various RAID levels can be expressed in terms of the number of storage devices in the RAID. A RAID of N+r storage devices can sustain r failures. In other words, the RAID will fail on the (r+1)th failure, where a storage device that can no longer perform IOs is considered to be failed. Typical values are r=1 for RAID 1 and RAID 5, and r=2 for RAID 6. If the state is of the RAID is defined by a tuplet [Number drives up, Number drives failed], a failure can be considered as moving from the [(N+r), 0] state to the [(N−1+r), 1] state. Thus for r=1, the progression of states [N+1, 0]→[N, 1]→[N−1, 2] is the sequence from full redundancy to failure. The [N, 1] state is an exposed state. It is possible to rebuild from the [N, 1] state back to the fully redundant [N+1, 0] state, i.e. [N, 1]→[N+1, 0]. For example, parity incorporated into the RAID data may be used to perform data reconstruction after the failed storage device is replaced with a new functional storage device. Thus the [N+r−1, 1] state can be rebuilt to the fully redundant [N+r, 0] state using parity. However, rebuilding from the [N, 1] state back to the fully redundant [N+1, 0] state can take considerable time, and during that time a second storage device failure can result in data loss. Consequently, a race condition exists between rebuild and a subsequent storage device failure. The generally accepted Paterson probability model for RAID failures follows the sequence of states described above from the fully protected state to the failed state. The model assumes that failures are random and follow a constant failure rate. The model also assumes that rebuild times are much smaller than the mean time to failure of each storage device. The probability model of data loss is the product of the probabilities of moving along the sequence of states.

One problem with the generally accepted model is that it fails to account for undetected and uncorrected faults. Such faults include recoverable internal defects such as bad blocks which occur prior to the rebuild process. A wide variety of fault modes can create bad blocks. Undetected and uncorrected faults are problematic because they can cause data unavailability and data loss in the RAID group. Data unavailability refers to the inability of the storage system to service host IO requests within an acceptable interval because data cannot be written or accessed until the drive set and its data is restored from a source that may be external to the storage system. Data loss refers to the inability to service host IO requests due to either the inability to restore data without an unacceptably long outage or the inability to restore the data from any source, i.e., irrevocable data loss. An example is where data required to rebuild a failed storage device is associated with an undetected or uncorrected fault on another storage device, e.g., parity data on a bad block on another drive in the RAID group.

Another problem is that drive health can be difficult to determine with generally available metrics. Bit error rate (BER) metrics, for example, only relate to bit errors in the head channel. However, media errors outweigh head channel faults by multiple orders of magnitude. Consequently, BER is a weak predictor for future data integrity, drive failure, data unavailability and data loss. Further, error counts based on IOs, such as those taken over a SCSI interface, take long periods of time to resolve and consequently can leave drives with latent errors over undesirably lengthy time intervals.

SUMMARY OF THE INVENTION

In accordance with an aspect of the invention, a method comprises: monitoring faults in individual storage devices of a redundant array of inexpensive disks (RAID) group; calculating a health indicator for each of the storage devices based on the monitored faults; and prompting replacement of a non-failed storage device based on the health indicator.

In accordance with another aspect of the invention, a computer program on a non-transitory computer-readable medium comprises: logic which monitors faults in individual storage devices of a redundant array of inexpensive disks (RAID) group; logic which calculates a health indicator for each of the storage devices based on the monitored faults; and logic which prompts replacement of a non-failed storage device based on the health indicator.

In accordance with another aspect of the invention, an apparatus comprises: a storage subsystem including a host device and a storage array with a redundant array of inexpensive disks (RAID) group, the storage subsystem including logic which monitors faults in individual storage devices of the RAID group, logic which calculates a health indicator for each of the storage devices based on the monitored faults, and logic which prompts replacement of a non-failed storage device based on the health indicator.

An advantage associated with at least one embodiment of the invention is mitigated susceptibility to data loss caused by undetected and uncorrected defects. More particularly, early swap out of storage devices based on health reduces occurrences of data unavailability and data loss and enables improved control of replacements in time. Moreover, the technique is an improvement over accepted indicators such as BER and error counts based on IOs in terms of speed and accuracy.

Another advantage is that use of lower reliability drives to achieve a particular level of availability at the system level may be possible. For example, lower protection RAID schemes such as RAIDS 7+1, RAIDS 3+1 and RAID1 may be able to satisfy previously unattainable availability targets under specific circumstances. This provides enhanced configuration flexibility and performance advantage over RAID6 that might otherwise be needed to obtain required performance and reliability levels.

Another advantage is that drive replacement rates may be decreased. Improving accuracy of device health estimation using fault growth rate may enable healthy drives that would otherwise exceed a bad block limit to remain in service. Further, unhealthy drives that do not exceed a bad block limit but are more likely to lead to data unavailability or data loss will be removed from service. In other words, drive replacement rate may decrease while susceptibility to data unavailability or data loss is also decreased.

Other features and advantages will become apparent in view of the figures and detailed description.

DETAILED DESCRIPTION

Various aspects of the invention may be implemented partially or completely in software using computer program code. The computer program code is stored on non-transitory computer-readable memory and utilized by processing hardware to implement instructions corresponding to certain steps. The program code may be provided as a computer program product or be integrated into network storage equipment. All of the illustrated devices may include processing hardware and non-transitory storage media capable of storing and implementing computer program code.

Figure 1:
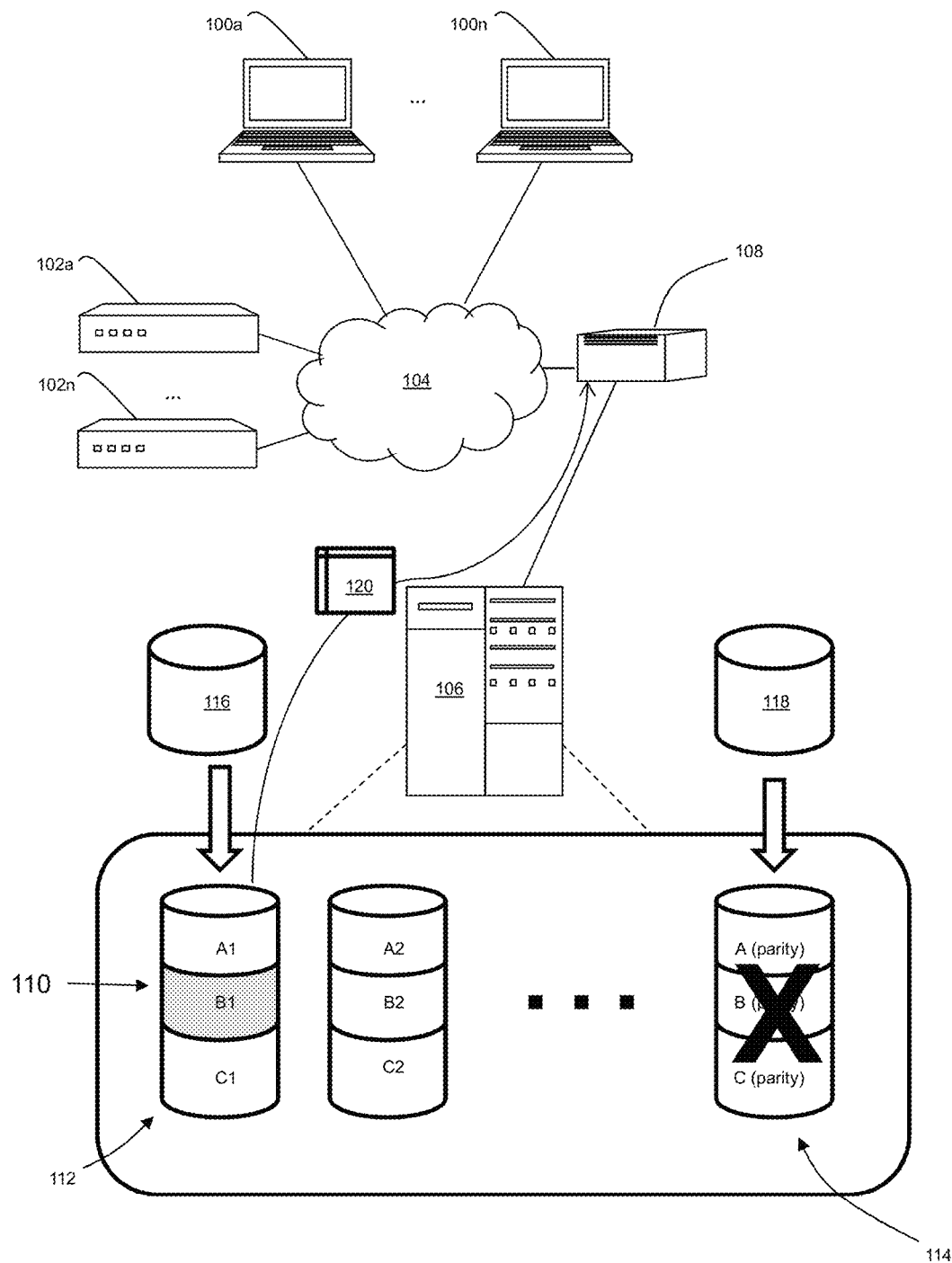
FIG. 1 illustrates a data storage subsystem in a simplified network environment.

FIG. 1 illustrates a simplified network environment in which applications running on devices such as user terminals 100a through 100n (including but not limited to personal computing devices of any kind) and servers 102a through 102n (including but not limited to computing devices of any kind which perform tasks for other devices) utilize data maintained by data storage resources of a data storage subsystem via network 104. The data storage subsystem may include an enterprise storage array 106, such as the Symmetrix system of EMC corporation, and a host device 108, which may be a type of server. The storage array 106 includes a RAID group 110 (B1, B2 . . . B (parity)) which may implement any available RAID level which may be characterized by striping, parity, or both, and have members which may occupy wholly or partially the storage space of the physical drives on which they resident. Moreover, RAIDs may occupy the whole or part of any one drive, and may share with one or more members of other RAID groups. It should also be noted that although a dedicated parity drive is shown, parity and can be striped across multiple drives, and parity and data can coexist on the same physical drive.

Storage devices in the RAID group 110 accumulate bad blocks over time, e.g., as represented by block B1. The host 108 may include background scrubbing routines that read-verify the physical data blocks of individual devices in the RAID group 110 to identify and correct these bad blocks, e.g., by rebuilding the data at a different block. However, these scrubbing routines can take an appreciable amount of time to execute because there may be many storage devices for the host to monitor, and host resources may be occupied by the primary responsibility of the host in providing data access to the user terminals and servers. This can become problematic if bad block growth rates in drive 112, for example, are faster than the scrubbing frequency because bad blocks will accumulate between host-based scrubbing times because data blocks, and consequently the RAID, are placed in an exposed state either continuously or for an unacceptable amount of time. This is particularly problematic when another drive, such as drive 114, fails because data unavailability or data loss may occur. Hence, a race conditions exists between bad block growth, scrubbing time, and disk failure rates.

Figure 2:
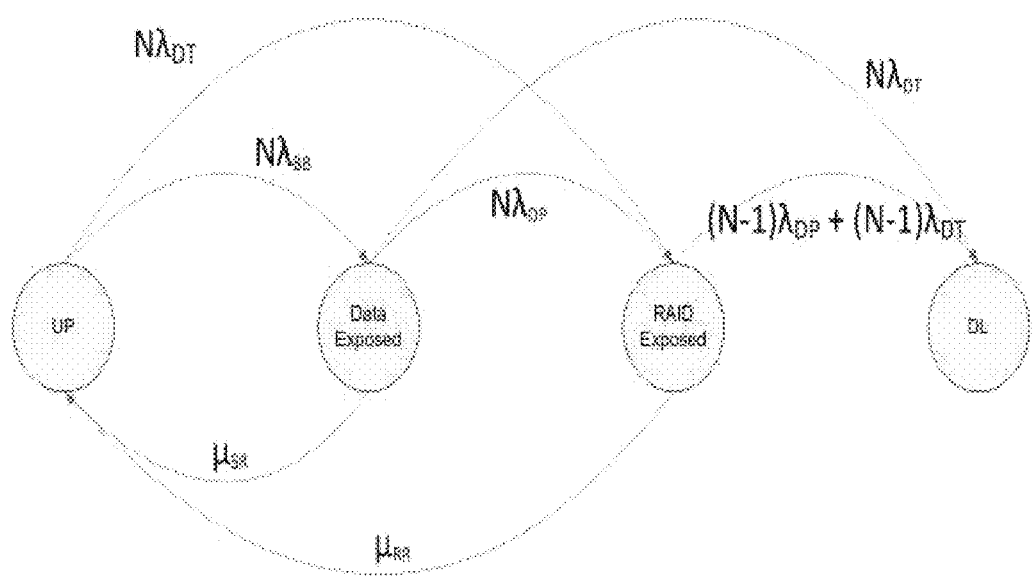
FIG. 2 illustrates an absorbing Markov state model of the race condition.

FIG. 2 is an absorbing Markov state model of the race condition. In this model $\lambda_{DP}$ is Drive Partial Failure Rate, $\lambda_{DT}$ is Drive Total Failure Rate, $\lambda_{BB}$ is Drive Bad Block Rate, $\mu_{SR}$ is Reassign Rate, and $\mu_{RR}$ is RAID Rebuild Rate. Referring to FIGS. 1 and 2, the data storage subsystem is configured to manage the frequency of movement from the UP state to the Data Exposed state. This may be accomplished by swapping out (replacing) storage devices prior to failure of those storage devices in order to avoid undetected or uncorrected faults which exist contemporaneously with a failure of another storage device with corresponding data required for rebuilding the failed storage device. For example, storage device 112 is swapped out with new storage device 116 when storage device 112 poses an unacceptable level of risk of undetected or uncorrected fault contemporaneous with failure of storage device 114. Consequently, drive 114 can more likely be swapped out upon failure and rebuilt on new drive 118 without data loss.

Figure 3:
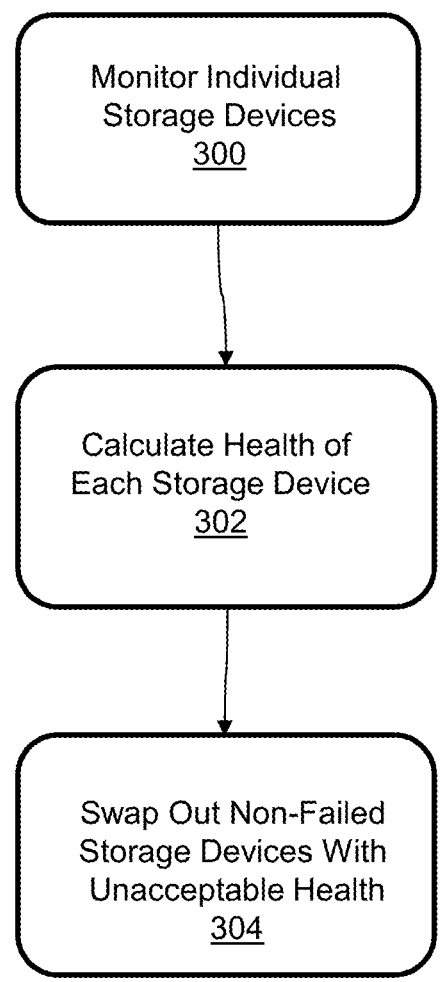
FIG. 3 illustrates a generalized technique for preventing data loss due to undetected or uncorrected defects.

FIG. 3 illustrates a generalized technique for preventing data loss and data unavailability due to undetected or uncorrected defects. Individual storage devices of the RAID group are monitored in step 300. In particular, bad block growth in each storage device is monitored. The bad block growth information is used to calculate the health of each storage device in step 302. In particular, health is calculated as a function of the rate of bad block growth. Storage devices characterized by an unacceptable level of health are swapped out in step 304. More particularly, non-failed storage devices which are capable of performing IOs, but which are characterized by an unacceptable level of health and thus pose an unacceptable risk are swapped out. In the event of multiple drives having poor health indicators, health indicators may be used to determine a replacement sequence and replacement timing of those drives.

Referring again to FIG. 1, background media scans (BMS) may be implemented to help maintain storage devices of the RAID group. Background media scans, such as defined by the SCSI T10 standard, detect media errors using storage device processing resources and microcode. In other words, individual storage devices self-scan. Background media scans are generally faster and more frequent than host-based background scrubbing routines because each storage device has its own scrubbing resources so scrubbing can be performed independently by each storage device in the RAID group 110. However, an individual storage device cannot rebuild data associated with the bad blocks identified via background media scans because individual storage devices have no contextual awareness of the RAID structure, e.g., no information regarding other storage devices in the RAID group or how data is related. The host 108 has information indicative of which data sets are valid in the RAID group. Consequently, a storage device which implements BMS communicates with the host 108 to inform the host that a bad block has been identified via a background media scan. The communication 120 may indicate bad blocks (e.g., from a BMS 03/11 sense code) and include time stamps indicating the time between errors, the physical locations of the errors on the storage device, and other information. In response, the host 108 manages rebuilding of the data by communicating with other storage devices in the RAID group, e.g., storage device 114, required to rebuild the data. Further, the host uses information obtained from those storage devices to rebuild the data, and communicates the rebuilt data back to the storage device which identified the bad block. The rebuilt data is then stored in a good block. While BMS-based monitoring represents an improvement over host-based monitoring, storage devices and the RAID group may still become exposed if the bad block growth rate is sufficiently high that the host is unable to manage rebuilding data in a timely manner. Thus, the race condition still exists.

Figure 4:
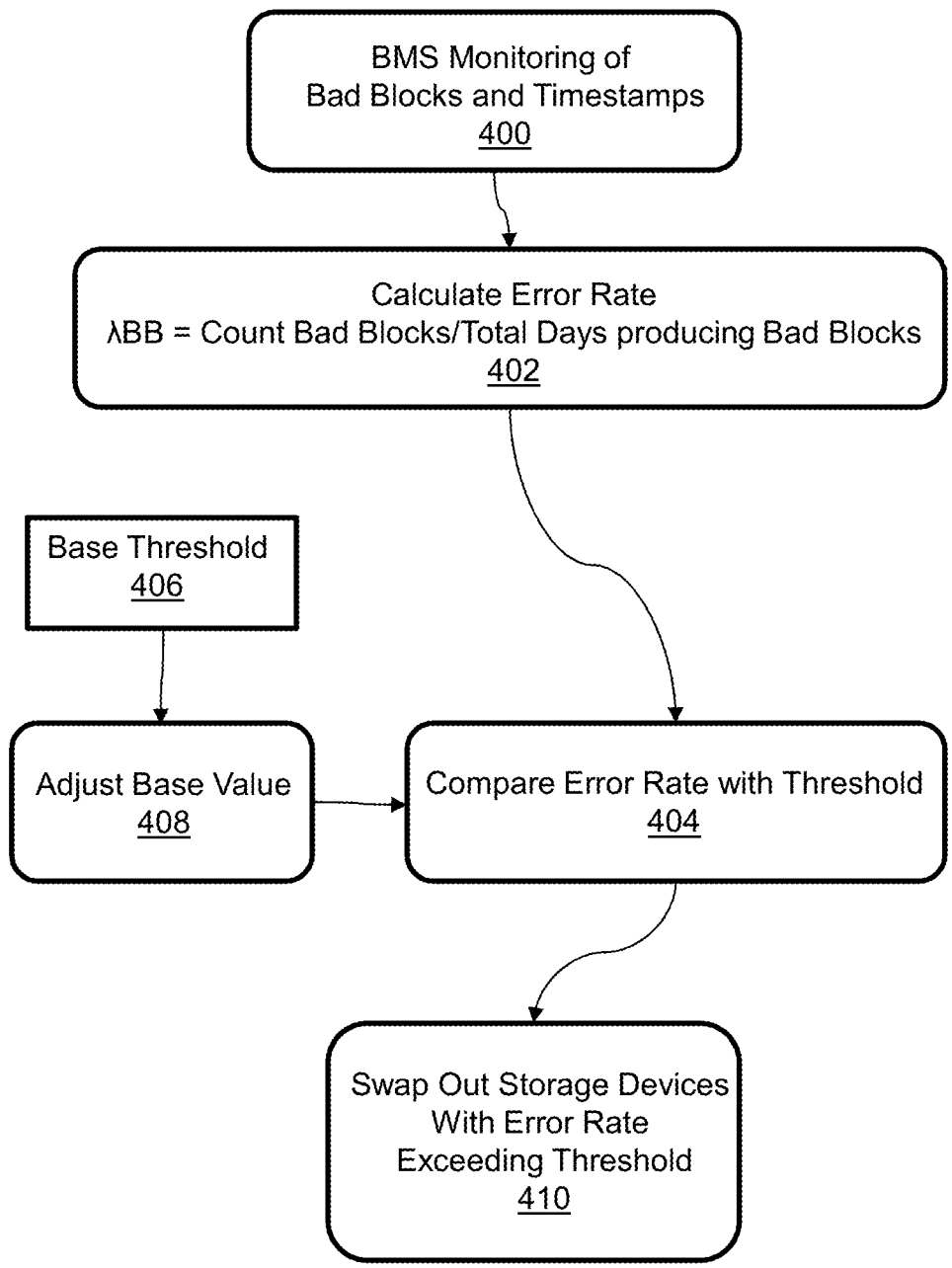
FIG. 4 illustrates an implementation of the technique of FIG. 3 based on background media scans.

Referring to FIGS. 1 and 4, information obtained from background media scans may also be used to monitor and calculate storage device health for swap out. As mentioned above, BMS tracks bad blocks internal to the storage device and includes time stamps indicating the time between errors. The rate of bad block generation can be calculated from the reported bad blocks and time stamps in step 400. An error rate, e.g., $\lambda_{BB}$=Count Bad Blocks/Total Days producing Bad Blocks, can be calculated from this data as indicated by step 402. In at least one embodiment the result is then compared with an acceptable/unacceptable threshold rate of bad block generation in step 404 to determine whether to prompt a device swap out.

A variety of factors may indicate a critically high error rate for a storage device. For example, a base value acceptable/unacceptable threshold rate 406 of bad block generation may be predetermined from testing various storage technologies, media types and models of storage devices. As indicated by step 408, the base value may be adjusted as a function of usage history, host scan rate, reassign rate, and potentially other relevant factors that include drive scan rate and aspects of the technology provided by the manufacturer and supplier. For example, the base threshold may be increased for a storage device performing many Write operations, or decreased for a storage device performing relatively few Write operations. Other indicators may also be used to adjust the base value threshold rate. For example, and without limitation, error code generation history and the physical location of errors on the storage device may indicate likelihood of serious latent errors in the future. As indicated in step 410, storage devices having an error rate which does not satisfy the threshold are swapped out.

Figure 5:
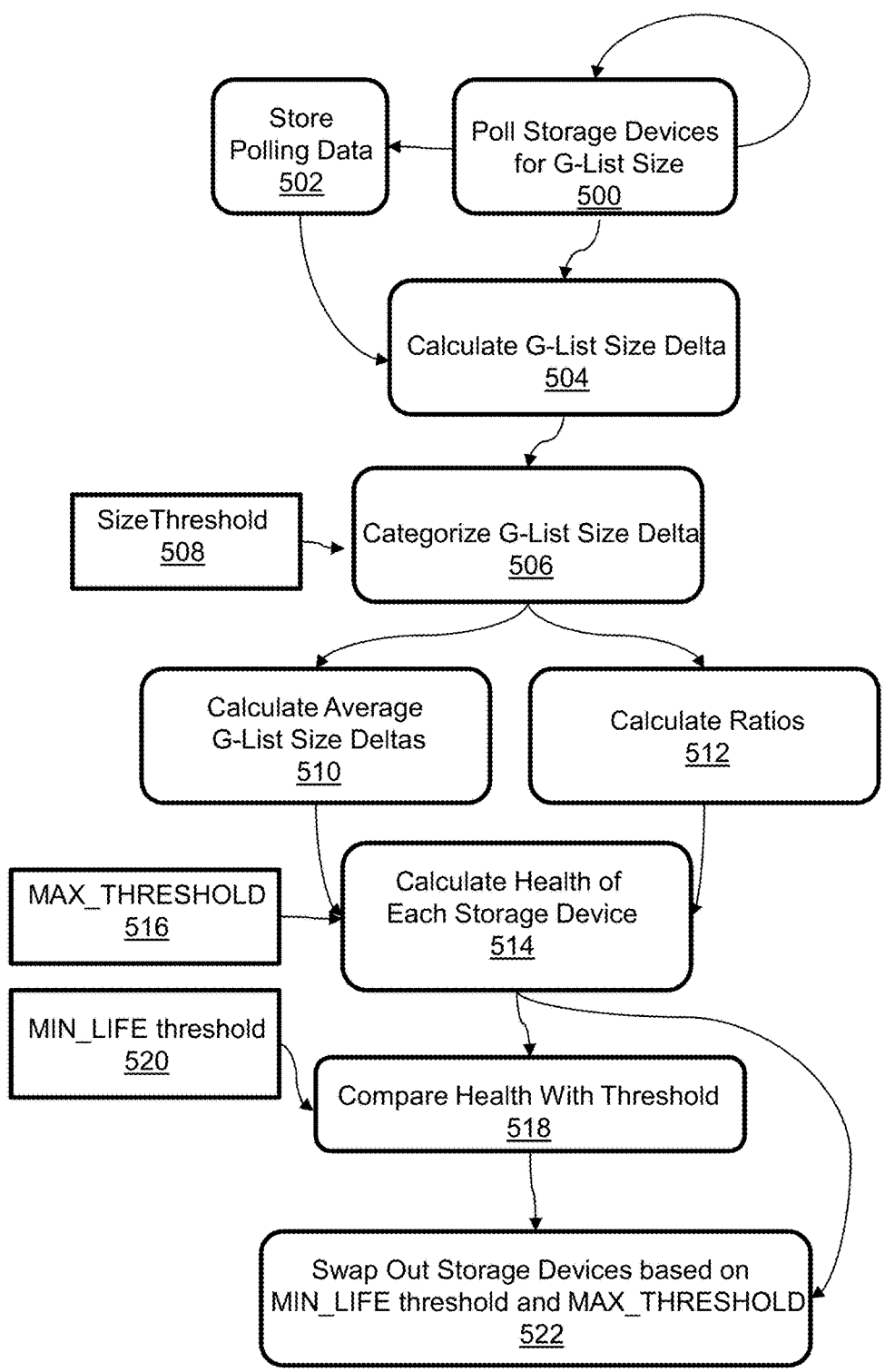
FIG. 5 illustrates an implementation of the technique of FIG. 3 based on bad block growth lists.

Referring to FIG. 5, another technique for monitoring bad block growth and calculating drive health is based on growth list (G-list) size. Each storage device in the RAID group has firmware which maintains a list of defective physical blocks. Each time the storage device reassigns a logical block, the corresponding defective physical block is added to the G-list. The G-list of a storage device is initially empty, but is built over the lifetime of the storage device as the firmware associated with the storage device detects bad blocks and reassigns. Monitoring may include a routine in the storage subsystem which polls storage device firmware on a periodic basis to obtain G-list size as indicated by step 500. The polling data is stored in a repository as indicated in step 502. Following each poll the G-list size for each storage device is compared with the G-list size for the device from the preceding poll as indicated by step 504 to calculate a G-list size delta. The G-list size delta is categorized in step 506, e.g., as either BURST, REGULAR, or IDLE growth, depending on a predefined base size threshold 508. More particularly, zero delta is indicative of IDLE growth, less than BURST THRESHOLD is indicative of REGULAR growth, and otherwise BURST growth is indicated. Counters of each growth category are maintained by the storage subsystem for every storage device. These counters are updated at the end of every polling cycle. Idle count indicates the number of times when no change was observed, Burst count indicates the number of times when Burst growth was observed, and Regular count indicates the number of time Regular growth was observed. The average values indicate the corresponding average growth rates when each type of growth was observed. Average delta values are calculated and maintained for each storage device based on the counters in step 510. The counters are also analyzed in step 512 to calculate, for each storage device, a ratio for Idle, Regular and Burst growth which indicates the percentage of the time that type of growth is observed. For example, 40:30:30 will indicate that no growth was observed 40% of the time, while Burst and Regular growth were each observed 30% of the time.

Disk health for each storage device is calculated based on average size delta, ratio and a life expectancy threshold in step 514. For example, the health calculation may indicate storage device life expectancy in terms of days until a predetermined maximum G-list size, MAX_THRESHOLD 516, will be reached. The health is then compared with another threshold in step 518. In particular, the health is compared with a predetermined MIN_LIFE threshold 520 indicative of the least acceptable threshold level for life expectancy in terms of days. If the health reaches the MIN_LIFE threshold, or if the G-List size reaches the MAX_THRESHOLD, the storage device is swapped out in step 522. The various thresholds can be calculated based on testing, and may vary based on factors including but not limited to device type, technology and other factors already mentioned above. Furthermore, base values of the thresholds may be adjusted in accordance with factors such as those already described above.

While the invention is described through the above exemplary embodiments, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures. Moreover, various features, aspects and embodiments may be combined in any of various ways without departing from the inventive concepts herein disclosed. Accordingly, the invention should not be viewed as limited except by the scope and spirit of the appended claims.

What is claimed is:

1. A method comprising:
   monitoring faults in each individual storage device of a plurality of storage devices of a redundant array of inexpensive disks (RAID) group by polling each of the storage devices for a growth list size;
   calculating a growth list size delta for each of the storage devices by comparing a current growth list size with a previous growth list size;

categorizing each growth list size delta as a growth type of a plurality of different growth types;
calculating a ratio of occurrence of the different growth types for each of the storage devices;
calculating an average growth list size delta for each of the storage devices;
calculating a health indicator for each of the storage devices based on the ratio and the average growth list size delta for that storage device, including calculating a health indicator for a non-failed storage device based on the ratio and the average growth list size delta for that non-failed storage device; and
prompting replacement of the non-failed storage device based on the health indicator for that non-failed storage device.

2. The method of claim 1 wherein monitoring faults includes performing background media scans.

3. The method of claim 2 wherein calculating a health indicator for a given storage device includes calculating an error rate indicative of bad block count per total days producing bad blocks.

4. The method of claim 3 including comparing the error rate with a threshold.

5. The method of claim 4 including calculating the threshold by adjusting a base value as a function of at least one of usage history, host scan rate, reassign rate, drive scan rate number of Write operations performed, error code generation history and physical location of errors on the storage device.

6. The method of claim 1 including calculating the health indicator of each storage device in terms of life expectancy based on the ratio, the average growth list size delta, and a predetermined maximum growth list size.

7. The method of claim 6 including prompting replacement of the non-failed storage device when the predetermined maximum growth list size has been reached or when a least acceptable threshold level for life expectancy has been reached.

8. The method of claim 1 including determining a replacement sequence of multiple non-failed storage devices based on the health indicators of the multiple non-failed storage devices.

9. The method of claim 1 including determining replacement timing of multiple non-failed storage devices based on the health indicators of the multiple non-failed storage devices.

10. A non-transitory computer-readable medium comprising:
computer program code comprising:
logic which monitors faults in each individual storage device of a plurality of storage devices of a redundant array of inexpensive disks (RAID) group by polling each of the storage devices for a growth list size;
logic which calculates a growth list size delta for each of the storage devices by comparing a current growth list size with a previous growth list size;
logic which categorizes each growth list size delta as a growth type of a plurality of different growth types;
logic which calculates a ratio of occurrence of the different growth types for each of the storage devices;
logic which calculates an average growth list size delta for each of the storage devices;
logic which calculates a health indicator for each of the storage devices based on the ratio and the average growth list size delta for that storage device, including calculating a health indicator for a non-failed storage device; and
logic which prompts replacement of the non-failed storage device based on the health indicator for that non-failed storage device.

11. The non-transitory computer-readable medium of claim 10 wherein the monitor logic performs background media scans.

12. The non-transitory computer-readable medium of claim 11 wherein the calculating logic calculates an error rate indicative of bad block count per total days producing bad blocks.

13. The non-transitory computer-readable medium of claim 12 including logic which compares the error rate with a threshold.

14. The non-transitory computer-readable medium of claim 13 including logic which calculates the threshold by adjusting a base value as a function of at least one of usage history, host scan rate, reassign rate, drive scan rate number of Write operations performed, error code generation history and physical location of errors on the storage device.

15. The non-transitory computer-readable medium of claim 10 including logic which calculates the health indicator of each storage device in terms of life expectancy based on the ratio, the average growth list size delta, and a predetermined maximum growth list size.

16. The non-transitory computer-readable medium of claim 15 including logic which prompts replacement of the non-failed storage device when the predetermined maximum growth list size has been reached or when a least acceptable threshold level for life expectancy has been reached.

17. The non-transitory computer-readable medium of claim 10 including logic which determines a replacement sequence of multiple non-failed storage devices based on the health indicators of the multiple non-failed storage devices.

18. The non-transitory computer-readable medium of claim 10 including logic which determines replacement timing of multiple non-failed storage devices based on the health indicators of the multiple non-failed storage devices.

19. Apparatus comprising:
a storage subsystem including a host device and a storage array with a redundant array of inexpensive disks (RAID) group, the storage subsystem including logic which monitors faults in each individual storage device of a plurality of storage devices of the RAID group by polling each of the storage devices for a growth list size, logic which calculates a growth list size delta for each of the storage devices by comparing a current growth list size with a previous growth list size, logic which categorizes each growth list size delta as a growth type of a plurality of different growth types, logic which calculates a ratio of occurrence of the different growth types for each of the storage devices, logic which calculates an average growth list size delta for each of the storage devices, logic which calculates a health indicator for each of the storage devices based on the ratio and the average growth list size delta for that storage device, including calculating a health indicator for a non-failed storage device, and logic which prompts replacement of the non-failed storage device based on the health indicator for that non-failed storage device.

20. The apparatus of claim 19 wherein the monitor logic includes background media scans implemented by individual storage devices of the RAID group.

21. The apparatus of claim 20 wherein the host calculates an error rate indicative of bad block count per total days producing bad blocks.

22. The apparatus of claim 21 wherein the host compares the error rate with a threshold.

23. The apparatus of claim 22 wherein the host calculates the threshold by adjusting a base value as a function of at least one of usage history, host scan rate, reassign rate, drive scan rate number of Write operations performed, error code generation history and physical location of errors on the storage device.

24. The apparatus of claim 19 wherein the host calculates the health indicator of each storage device in terms of life expectancy based on the ratio, the average growth list size delta, and a predetermined maximum growth list size.

25. The apparatus of claim 24 wherein the host prompts replacement of the non-failed storage device when the predetermined maximum growth list size has been reached or when a least acceptable threshold level for life expectancy has been reached.

26. The apparatus of claim 19 wherein the host determines a replacement sequence of multiple non-failed storage devices based on the health indicators of the multiple non-failed storage devices.

27. The apparatus of claim 19 wherein the host determines replacement timing of multiple non-failed storage devices based on the health indicators of the multiple non-failed storage devices.

* * * * *